(12) United States Patent
Gerengi

(10) Patent No.: US 8,782,865 B2
(45) Date of Patent: Jul. 22, 2014

(54) COMBUSTOR LINER AND FLOW SLEEVE TOOL

(75) Inventor: Mustafa Gerengi, Kocaeli (TR)

(73) Assignee: General Electric Company, Schenectady, NY (US)

( * ) Notice: Subject to any disclaimer, the term of this patent is extended or adjusted under 35 U.S.C. 154(b) by 500 days.

(21) Appl. No.: 13/160,914

(22) Filed: Jun. 15, 2011

(65) Prior Publication Data

US 2012/0233845 A1    Sep. 20, 2012

(30) Foreign Application Priority Data

Mar. 16, 2011 (TR) .................. a 2011 02511

(51) Int. Cl.
| | | |
|---|---|---|
| *B23P 19/04* | (2006.01) | |
| *F23R 3/00* | (2006.01) | |
| *F01D 25/28* | (2006.01) | |
| *F02C 7/20* | (2006.01) | |
| *F23R 3/44* | (2006.01) | |

(52) U.S. Cl.
CPC ......... *F23R 3/00* (2013.01); *F23R 2900/00017* (2013.01); *F01D 25/28* (2013.01); *F23R 2900/00019* (2013.01); *F02C 7/20* (2013.01); *F23R 3/44* (2013.01)

USPC .............................................. 29/244; 29/278

(58) Field of Classification Search
USPC ................ 29/244, 235, 278, 281.1, 271, 252
See application file for complete search history.

(56) References Cited

U.S. PATENT DOCUMENTS

| | | | |
|---|---|---|---|
| 3,828,830 A | 8/1974 | Hill et al. | |
| 6,415,491 B1 * | 7/2002 | Klann | 29/259 |
| 6,609,283 B1 * | 8/2003 | Somerville | 29/262 |
| 7,216,409 B1 * | 5/2007 | Chiu et al. | 29/259 |
| 7,386,926 B2 * | 6/2008 | Bosche et al. | 29/227 |
| 7,653,975 B2 * | 2/2010 | Hu | 29/259 |
| 7,669,306 B2 * | 3/2010 | Palka | 29/261 |
| 8,079,123 B2 * | 12/2011 | Lin | 29/259 |
| 2001/0032385 A1 * | 10/2001 | Abdelmoula et al. | 29/426.5 |
| 2005/0022368 A1 | 2/2005 | Ponzio et al. | |
| 2012/0233845 A1 * | 9/2012 | Gerengi | 29/466 |

* cited by examiner

*Primary Examiner* — Lee D Wilson
(74) *Attorney, Agent, or Firm* — Cantor Colburn LLP

(57) ABSTRACT

A tool includes an annular frame portion including a mount portion extending radially from the frame portion, a hook portion arranged on the mount portion, the hook portion sized and shaped to engage a member of a tubular component of a turbine combustor, and a force exertion portion arranged on the mount portion, the force exertion portion operative to engage a portion of the turbine combustor.

12 Claims, 5 Drawing Sheets

COMBUSTOR LINER AND FLOW SLEEVE TOOL

CROSS-REFERENCE TO RELATED APPLICATIONS

This application claims the benefit of Foreign Application Serial No. 2011/02511, entitled "Combustor Liner and Flow Sleeve Tool", filed Mar. 16, 2011, in Turkey, which is incorporated herein by reference in its entirety.

BACKGROUND OF THE INVENTION

The subject matter disclosed herein relates to turbine systems, and in particular to turbine combustion liners and flow sleeves.

Turbine systems include a combustor portion having a cavity where fuel mixes with compressed gas and is ignited. The fuel enters the combustor portion through fuel nozzles that are arranged in orifices communicative with the cavity. The orifices are exposed to high temperatures and include a removable tubular liner portion and a flow sleeve portion that insulate portions of the combustor and direct gas flow during system operation.

BRIEF DESCRIPTION OF THE INVENTION

According to one aspect of the invention, a tool includes an annular frame portion including a mount portion extending radially from the frame portion, a hook portion arranged on the mount portion, the hook portion sized and shaped to engage a member of a tubular component of a turbine combustor, and a force exertion portion arranged on the mount portion, the force exertion portion operative to engage a portion of the turbine combustor.

According to another aspect of the invention, a method for positioning a tubular component of a turbine combustor includes aligning a tool coaxially with the tubular component, rotating the tool such that an aperture of a hook portion of the tool engages a protruding stopper of the tubular component, operating a force exertion portion of the tool to slidably change the position of the tubular component along a linear axis of the turbine combustor.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
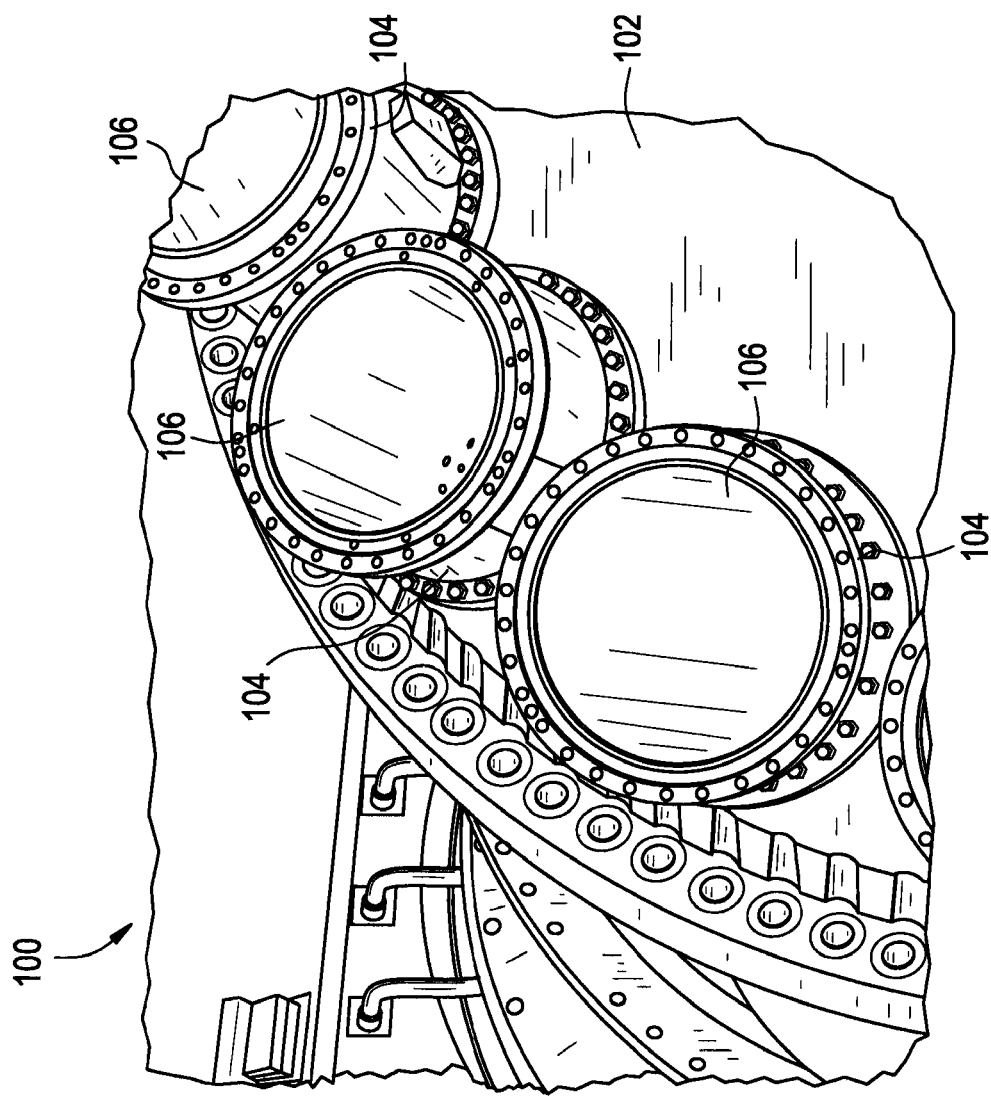
FIG. 1 illustrates a perspective view of a combustor portion of a turbine system.

FIG. 1 illustrates a perspective view of a combustor portion (compressor discharge case) 102 of a turbine system 100, the combustor portion 102 includes a plurality of mounting cases (combustion cases) 104 arranged on the combustor portion 102. The mounting cases 104 are tubular and define an inner cavity that is communicative with the interior of the combustor portion 102. A combustor liner portion 106 and a flow sleeve portion (not shown) are disposed in each of the mounting cases 104. In operation, fuel nozzle assembly (not shown) is mounted in each of the mounting cases 104; and is operative to emit fuel into the combustor portion 102.

During installation and maintenance procedures, technicians may remove and reinstall or replace the combustor liner portion 106 and flow sleeve portion. Previous maintenance procedures included using manual winches, chain blocks, and other unshaped tools for removing and installing the combustor liner portion 106 and flow sleeve portion. The previous procedures and tools were inefficient and time consuming.

Figure 2:
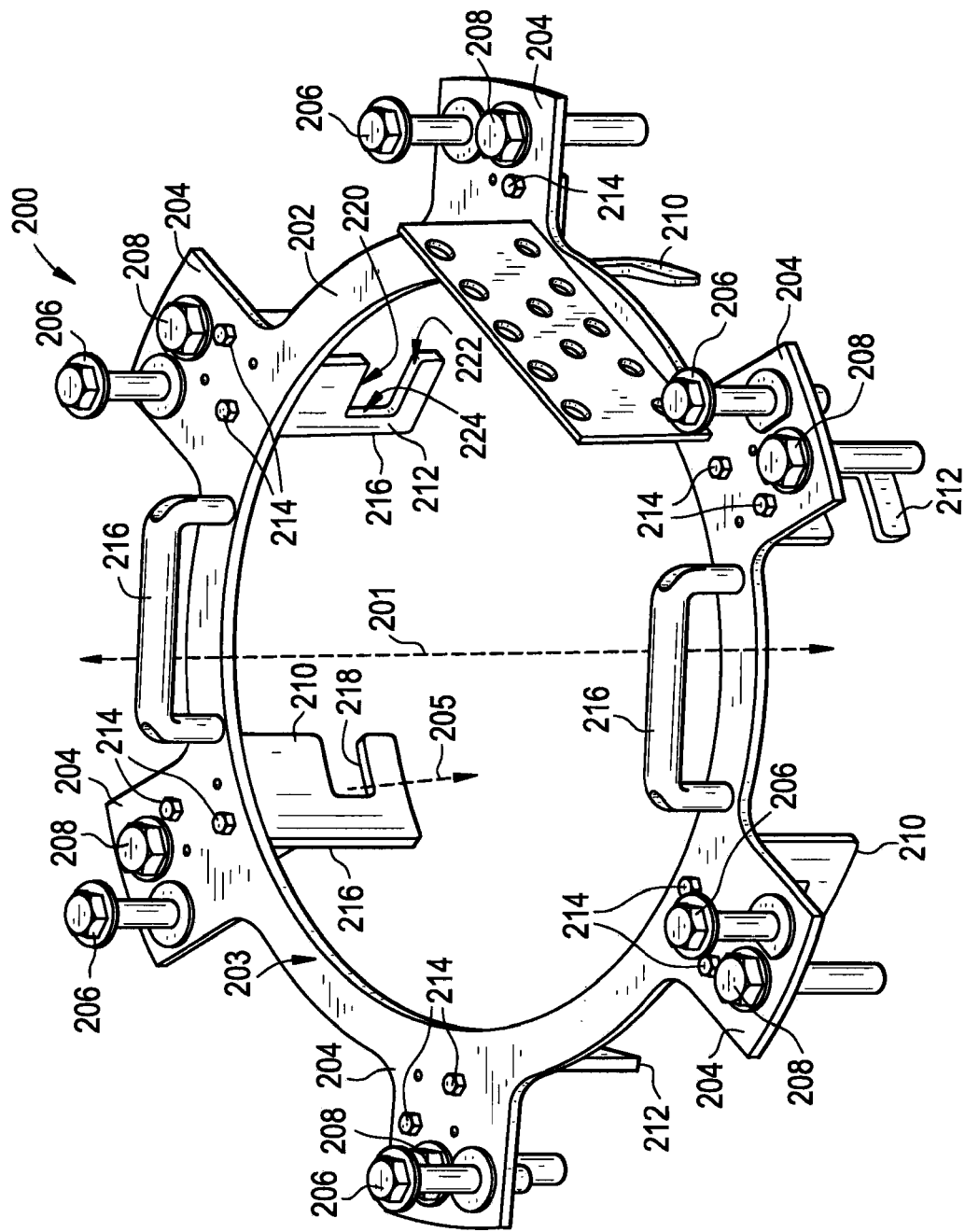
FIG. 2 illustrates a perspective view of an exemplary embodiment of a tool.

FIG. 2 illustrates a perspective view of an exemplary embodiment of a tool 200. The tool 200 includes an annular frame portion 202 having a rotational axis 201 and a planar surface 203, which includes mount portions 204 that extend radially from the frame portion 202. The mount portions 204 include orifices that may include for example, threaded inner surfaces that are operative to engage installation and removal means. In the illustrated embodiment, a threaded removal bolt 206 and a threaded installation bolt 208 engage each mount portion 204. The tool 200 includes liner hooks 210 and flow sleeve hooks 212. In the illustrated embodiment, the liner hooks 210 and the flow sleeve hooks 212 are arranged on the frame portion 202 proximate to the mount portions 204, and are secured to the frame portion 202 using fasteners 214. The hooks 210 and 212 each include a plate 216 having a longitudinal axis 205, the plate 216 defines an aperture 218. The aperture 218 defines a first planar surface 220, a second planar surface 222, and a third planar surface 224. The first planar surface 220 is arranged substantially in parallel to the second planar surface 222 and the planar surface 203 (of the frame portion 202). The third planar surface 224 is arranged substantially perpendicular to the first planar surface 220 and the second planar surface 222 (and parallel to the rotational axis 201). The tool 200 may include handles 216 that are arranged on the frame portion 202.

Figure 3:
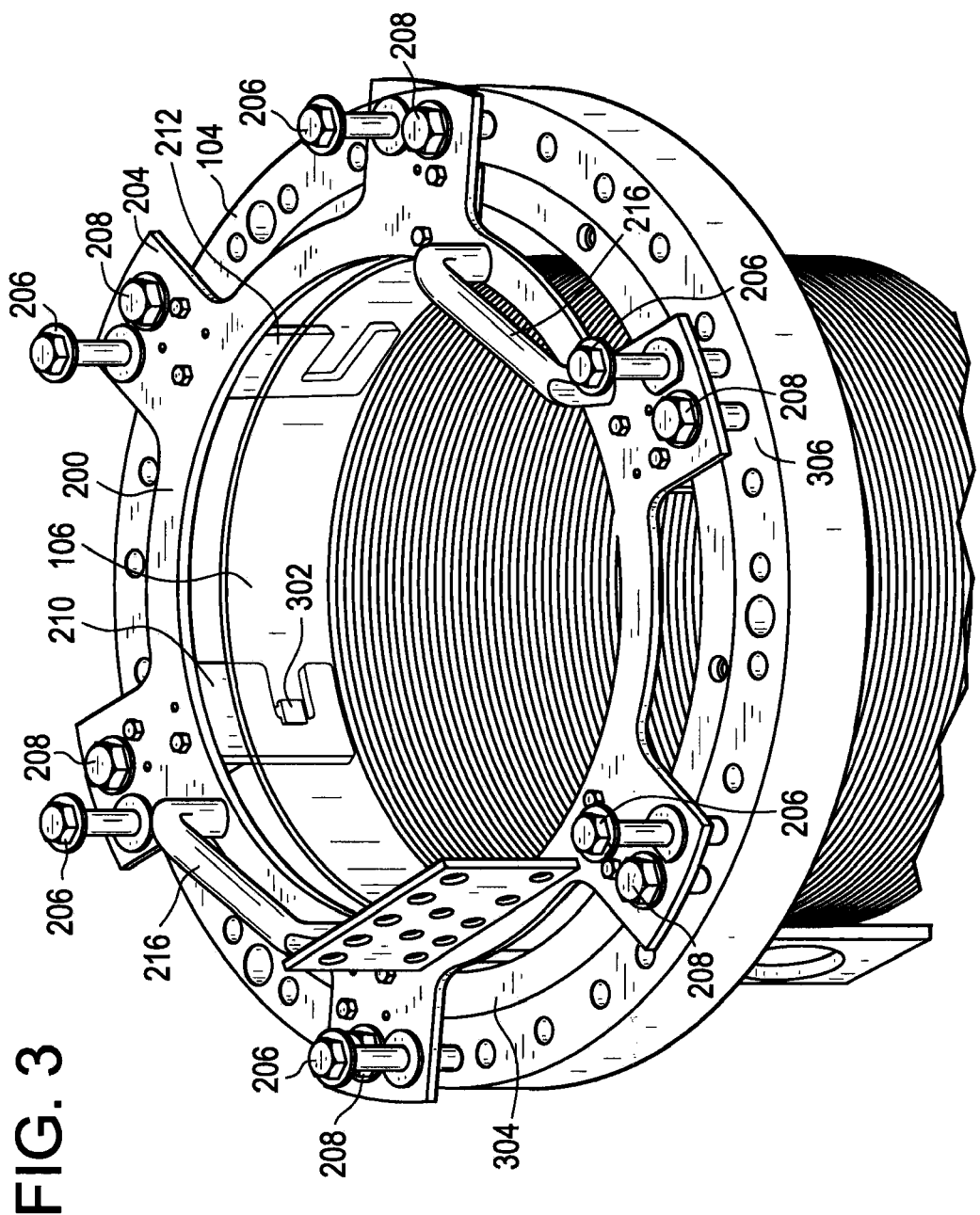
FIG. 3 illustrates a perspective, partially cut-away view of the tool of FIG. 2 engaging a combustor liner portion.
Figure 4:
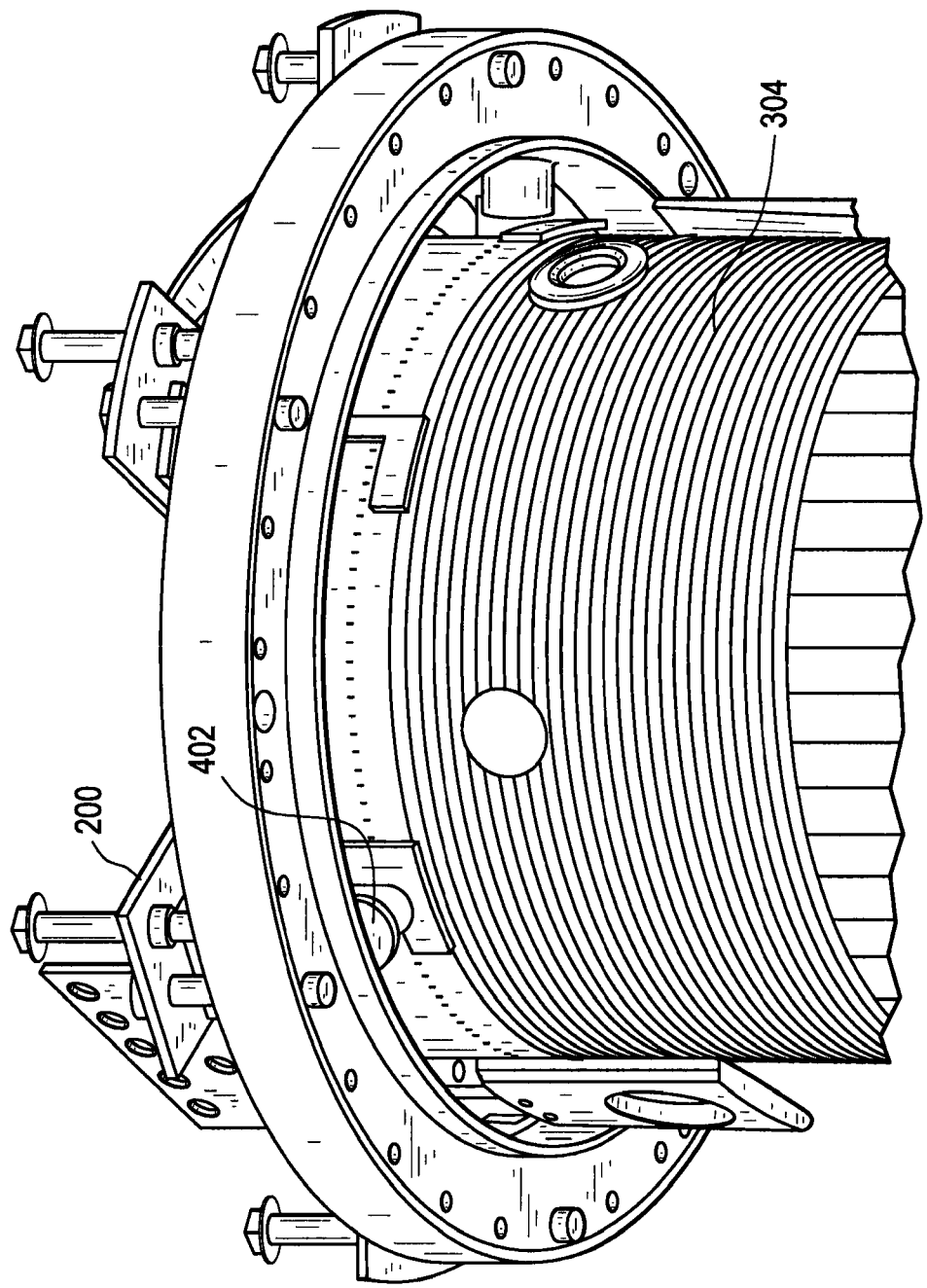
FIG. 4 illustrates a perspective, partially cut-away view of the tool of FIG. 2 engaging a flow sleeve portion.

FIG. 3 illustrates a perspective, partially cut-away view of the tool 200 engaging the combustor liner portion 106 that is arranged in the mounting case 104. The combustor liner portion 106 includes installation stoppers 302 that extend radially from the combustor liner portion 106. The liner hooks 210 are sized and shaped to engage the installation stoppers 302. FIG. 4 illustrates a perspective, partially cut-away view of the tool 200 engaging flow sleeve stoppers 402 of the flow sleeve portion 304.

In removal operations, the tool 200 is aligned coaxially with the combustor liner portion 106 and the mounting case 104, and rotated such that the liner hooks 210 engage the installation stoppers 302. The removal bolts 206 may be rotated using, for example, a wrench or similar tool (not shown) to exert a force on the mounting case 104 that draws the tool 200 and the engaged combustor liner portion 106 outwardly from the mounting case 104 along the linear axis of the mounting case 104. Once the combustor liner portion 106 has been partially extracted from the mounting case 104 a force may be exerted on the handles 216 to fully extract the combustor liner portion 106 from the mounting case 104. Following the removal of the combustor liner portion 106, a similar procedure may be used to remove the flow sleeve portion 304. In this regard, the flow sleeve hooks 212 engage installation stoppers (not shown) that are arranged on the flow sleeve portion 304; and the removal bolts 206 are rotated to draw the tool 200 and the engaged flow sleeve portion 304 outwardly from the mounting case 104. The flow sleeve hooks 212 may be removed from the tool 200 prior to removing the liner portion 106 if desired.

In installation operations, the flow sleeve portion 304 is inserted into the mounting case 104, and the tool 200 is aligned coaxially with the flow sleeve portion 304 and rotated such that the flow sleeve hooks 212 engage the flow sleeve stoppers. The installation bolts 208 engage threaded orifices 306 of the mounting case 104; and are rotated to draw the tool 200 and the engaged flow sleeve portion 304 inwardly such that the flow sleeve portion 304 is fully inserted into the mounting case 104. The combustor liner portion 106 may be installed using a similar installation procedure.

Figure 5:
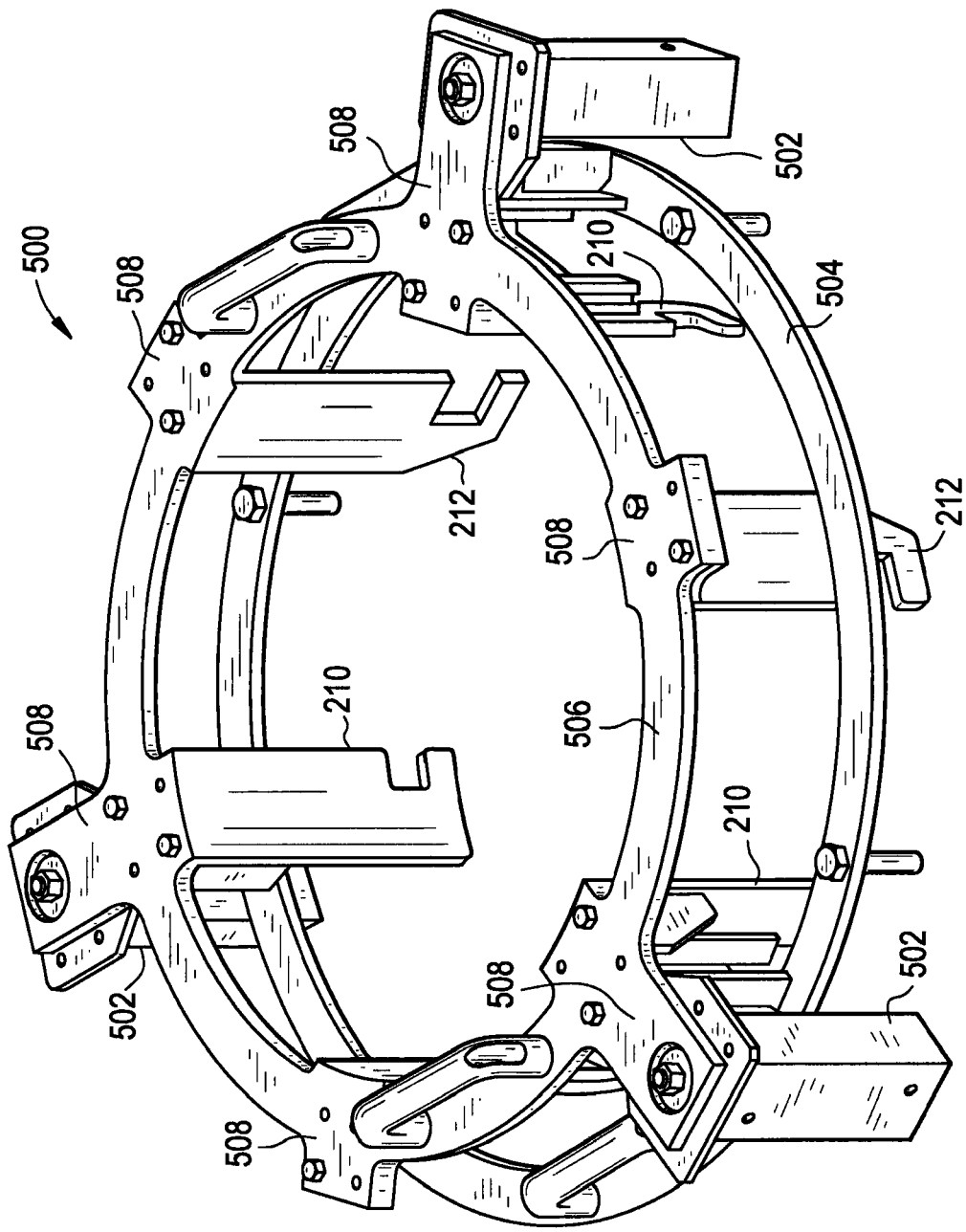
FIG. 5 illustrates a perspective view of an alternate embodiment of a tool.

FIG. 5 illustrates a perspective view of an alternate embodiment of a tool 500. The tool 500 is similar to the tool 200 described above, however the tool 500 includes hydraulic jack members 502 that are arranged on a jack frame portion 504. A frame portion 506 that includes mounting portions 508 is arranged on the jack members 502. Flow sleeve hooks 212 and liner hooks 210 are arranged on the mounting portions 508. The tool 500 operates in a similar manner as the tool 200, however, the insertion and removal forces are exerted by the hydraulic jack members 502 as opposed to the bolts 206 and 208 (of FIG. 2)

In the illustrated embodiment, the tools 200 and 500 includes three flow sleeve hooks 212 and three liner hooks 210 that are sized and shaped to engage corresponding stoppers arranged on the flow sleeve portion 304 and the combustor liner portion 106 respectively (of FIGS. 1 and 2). Alternate embodiments may include any number of hooks 212 and 210 that may be sixed and shaped to engage alternate arrangements of flow sleeve portions 304 and combustor liner portions 106 having, for example, alternate installation stopper arrangements, shapes, or designs.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A tool comprising:
    an annular frame portion including a mount portion extending radially from the frame portion;
    a hook portion arranged on the mount portion, the hook portion sized and shaped to engage a member of a tubular component of a turbine combustor; and
    a force exertion portion arranged on the mount portion, the force exertion portion operative to engage a portion of the turbine combustor, wherein the hook portion includes an aperture arranged in parallel to a rotational axis of the frame portion.

2. The tool of claim 1, wherein the hook portion includes a plate defining the aperture.

3. The tool of claim 2, wherein the aperture is defined by a first planar surface arranged substantially in parallel with a second planar surface.

4. The tool of claim 3, wherein the aperture is further defined by a third planar surface arranged substantially perpendicular to the first planar surface.

5. The tool of claim 3, wherein the first planar surface is arranged in parallel with a planar surface of the frame portion.

6. The tool of claim 1, wherein the force exertion portion includes a first threaded member engaging the mount portion.

7. The tool of claim 6, wherein the force exertion portion includes a second threaded member engaging the mount portion.

8. The tool of claim 1, wherein the tool further includes a second annular frame portion, wherein the force exertion portion is connected to the second annular frame portion.

9. The tool of claim 1, wherein the force exertion portion includes a hydraulic jack member.

10. The tool of claim 1, wherein the tool further includes a handle arranged on the annular frame portion.

11. The tool of claim 1, wherein the force exertion portion is operative to engage a threaded orifice of a combustor portion of a turbine system.

12. The tool of claim 1, wherein the hook portion is secured to the mount portion with a fastener.

* * * * *